United States Patent [19]

Misono et al.

[11] Patent Number: 5,574,909
[45] Date of Patent: Nov. 12, 1996

[54] APPARATUS AND METHOD FOR DATA SEARCH USING SELECTED OR REPRESENTATIVE DATA SAMPLE

[75] Inventors: Shinji Misono, Tokyo; Kazuo Iwano, Yokohama; Jung-Kook Hong, Tokyo, all of Japan

[73] Assignee: International Business Machines Corporation, Armonk, N.Y.

[21] Appl. No.: 531,570

[22] Filed: Aug. 28, 1995

Related U.S. Application Data

[63] Continuation of Ser. No. 221,917, Apr. 1, 1994, abandoned.

[30] Foreign Application Priority Data

Apr. 5, 1993 [JP] Japan .................................. 5-078052

[51] Int. Cl.⁶ .............................. G06F 17/30; G06F 3/14
[52] U.S. Cl. ............................ 395/601; 352/62; 358/453;
364/DIG. 1; 364/225.4; 364/225.5; 364/225.6;
395/788; 395/340; 395/348
[58] Field of Search ...................................... 395/600, 157,
395/159, 162; 358/453; 364/DIG. 1; 352/62

[56] References Cited

U.S. PATENT DOCUMENTS

| | | | |
|---|---|---|---|
| 4,598,385 | 7/1986 | Kessels et al. | 395/600 |
| 4,748,439 | 5/1988 | Robinson et al. | 340/146.2 |
| 4,791,556 | 12/1988 | Vilkaitis | 364/200 |
| 5,107,343 | 4/1992 | Kawai | 358/341 |
| 5,136,394 | 8/1992 | Haikawa et al. | 358/335 |
| 5,191,645 | 3/1993 | Carlucci et al. | 395/159 |
| 5,220,648 | 6/1993 | Sato | 395/146 |
| 5,241,671 | 8/1993 | Reed et al. | 395/600 |
| 5,287,448 | 2/1994 | Nicol et al. | 395/159 |
| 5,339,433 | 8/1994 | Frid-Nielsen | 395/700 |
| 5,526,480 | 6/1996 | Gibson | 395/154 |

FOREIGN PATENT DOCUMENTS 63-181728  7/1988  Japan .
0421443  1/1992  Japan .

OTHER PUBLICATIONS

Mastering Windows 3.1 Special editions Robert Cowart, 1992 pp. 86, 128, 129, 150, 732.

*Primary Examiner*—Thomas G. Black
*Assistant Examiner*—Jean R. Homere
*Attorney, Agent, or Firm*—James C. Pintner

[57] ABSTRACT

The invention relates to searching for a desired data item within a group of data. Representative samples among a group of data to be searched are displayed, and two representative samples in display are selected to specify a new area of data to be searched. Thus, the portion of the data is bracketed and narrowed down, and the desired data item is found quickly and efficiently.

11 Claims, 9 Drawing Sheets

APPARATUS AND METHOD FOR DATA SEARCH USING SELECTED OR REPRESENTATIVE DATA SAMPLE

This is a continuation of application Ser. No. 08/221,917, filed on Apr. 1, 1994, now abandoned.

FIELD OF THE INVENTION

This invention relates to a data search apparatus and method for searching a sequence of data stored on a storage medium and visually outputting desired data.

BACKGROUND OF THE INVENTION

When a specific frame (image data in a amount of one screen) on an unknown storage location in movie data stored on a storage medium is searched by a data search apparatus, the data search apparatus normally reads the movie data on the storage medium sequentially from a start storage location and displays them on a display unit. Viewing the display screen, the user waits for appearance of a desired frame. In such a sequential search method, the closer to the last part of the storage medium is the storage location of the desired frame, the more time is taken until the user finds the desired frame.

Then, a data search apparatus is proposed (Japanese Patent Application Laying-open No. 32473/1990) in which the movie data are previously divided into a plurality of blocks, a frame representing each block is displayed as an icon, and the user nominates a desired icon to specify the movie data set of the block shown by the nominated icon to be searched.

In the method of Japanese Patent Application Laying-open No. 32473/1990, it is assumed that the data to be searched are previously divided into a plurality of partial regions. And a method was explained such that a region to be searched is narrowed in one of the partial regions. However, this method involves a problem in that a region stretching over a plurality of partial regions cannot be specified as a searching target at a same timing. Therefore, an inefficient search is required such that the partial region which may contain the objective data is searched one by one. A second problem of this method is that only an interface for narrowing the region to be searched is provided. Therefore, when it is found that the objective data are absent in the section as a result of search, it is necessary to specify the entire partial region as a region to be searched and narrow again the region and by this, the efficiency of search work is considerably reduced. Furthermore, a problem exists such that when a region including a number of representative frames is specified as a region to be searched, it is necessary to nominate a number of icons and then operation requires a tedious work.

SUMMARY OF THE INVENTION

An object of the present invention is to provide an apparatus and a method for data search which, utilizing the advantage that representative data are displayed and the region to be searched is specified by the user, can simplify operation by the user even further to find the desired data easily.

In accordance with the present invention which attains the above object, an embodiment of claim 1 comprises data extracting means for dividing a sequence of data to be searched and for extracting a plurality of representative samples of data from the sequence of data, each representative sample located at the dividing position, display means for displaying the plurality of extracted representative samples of data, selecting means for selecting two representative samples among those displayed, and data search region determining and changing means for determining, as a new sequence of data to be searched, a sequence of data whose start and end positions are specified by the two selected representative samples.

An embodiment of claim 2 further comprises initial data search region determining means for determining an initial region of data to be searched according to a position on a scroll bar specified by an user.

An embodiment of claim 3 comprises a step for dividing a sequence of data to be searched and for extracting a plurality of representative samples of data from the sequence of data, each representative sample located at the dividing position, a step for displaying the plurality of extracted representative samples of data, a step for selecting two representative samples among those displayed, and a data search region determining and changing step for determining, as a new sequence of data to be searched, a sequence of data whose start and end positions are specified by the two selected representative samples.

An embodiment of claim 4 further comprises a step for the data search method as claimed in claim 3 further comprising a step for convertibly displaying a plurality of second representative samples which are obtained from the sequence of data to be searched before changing, instead of a plurality of first representative samples according to an external instruction when said plurality of first representative samples obtained from said new sequence of data to be searched are displayed.

An embodiment of claim 5 further comprises a step for the data search method as claimed in claim 3 further comprising a step for determining whether or not there are representative samples coinciding with each other between a plurality of second representative samples obtained from said sequence of data to be searched before changing and a plurality of first representative samples when said plurality of first representative samples obtained from said new sequence of data to be searched are displayed and for changing the coinciding first representative samples to display the changed samples when an affirmative determination is obtained.

In an embodiment of claim 6, the data search method as claimed in claim 3 wherein a start icon and an end icon individually indicating said start and end positions of said sequence of data to be searched are displayed in said representative sample displaying step, and start or end position of said new sequence of data to be searched is determined according to an instruction of said start icon or said end icon in said data search region determining and changing step.

An embodiment of claim 7 further comprises a step for displaying a region specified by the selected two representative samples in connection with a display of the plurality of representative samples.

In an embodiment of claim 8, the sequence of data are movie data, and the representative sample is image data of one frame.

In an embodiment of claim 9, the sequence of data are text data, and the representative sample is data in a predetermined amount within the text data.

The embodiments of claims 1 and 3 reduce the region to be searched sequentially by selecting the positions of two representative data-samples.

The embodiment of claim 2 uses a scroll bar to specify the initial region to be searched.

The embodiment of claim 4 enables not only reduction but also enlargement of the region to be searched.

The embodiment of claim 5 shows the user a number of representative images by displaying different representative data every reduction of the region to be searched.

The embodiment of claim 6 uses the start icon and/or the end icon to specify the region when the start and/or end position of the foregoing region to be searched is the same as before, representative samples different from the previous one are displayed in order to display as many different representative samples.

The embodiment of claim 7 displays a region determined by selected two representative samples to enable the user to confirm the region.

The embodiment of claim 8 applies moving picture data as data to be searched to simplify the moving data search work.

The embodiment of claim 9 applies text data as data to be search to simplify the text data search work.

DESCRIPTION OF THE PREFERRED EMBODIMENT

Embodiments of the present invention will now be described in detail with reference to the drawings.

Figure 2:
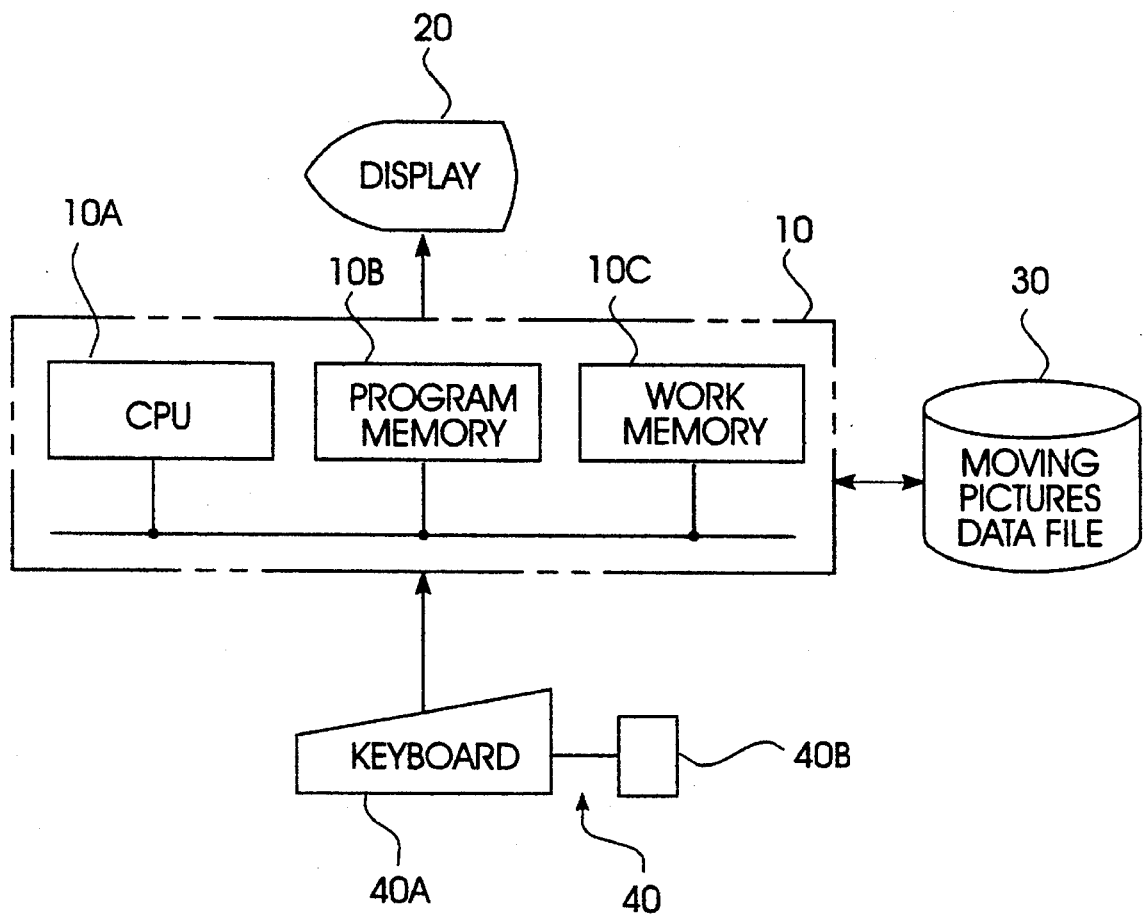
FIG. 2 is a block diagram showing the system structure of the embodiment of the present invention.

A system arrangement of a data search apparatus to which the present invention is applied will be described using FIG. 2. In FIG. 2, a calculator (computer) 10 is connected with a display 20, a file storage device 30, and an input device 40. The calculator (computer) 10 can be a computer which is capable of image processing, such as a personal computer. The calculator (computer) 10 has a CPU 10A, a program memory 10B, and a work memory 10C. The CPU 10A executes the control procedure of FIG. 6 to FIG. 8 stored in the program memory 10B to achieve the movie data search function according to the present invention. The work memory 10C temporarily stores various data used for the search processing and image data displayed on the display 20.

The display 20 can be a dot matrix type display such as a CRT display device. The file storage device 30 can be a floppy disk storage device (FDD) or a hard disk storage device (HDD). The file storage device 30 stores movie image data in units of frames. The input device 40 comprises a keyboard 40A and a mouse 40B. (A mechanism of screen pointing in the present invention is not restricted to a pair of a keyboard and a mouse. Hereinafter explanations are done in the case of mouse 40B is equipped with a keyboard 40A. When only a keyboard 40A is equipped, an appropriate screen pointing mechanism using a keyboard is assumed.)

Figure 1A:
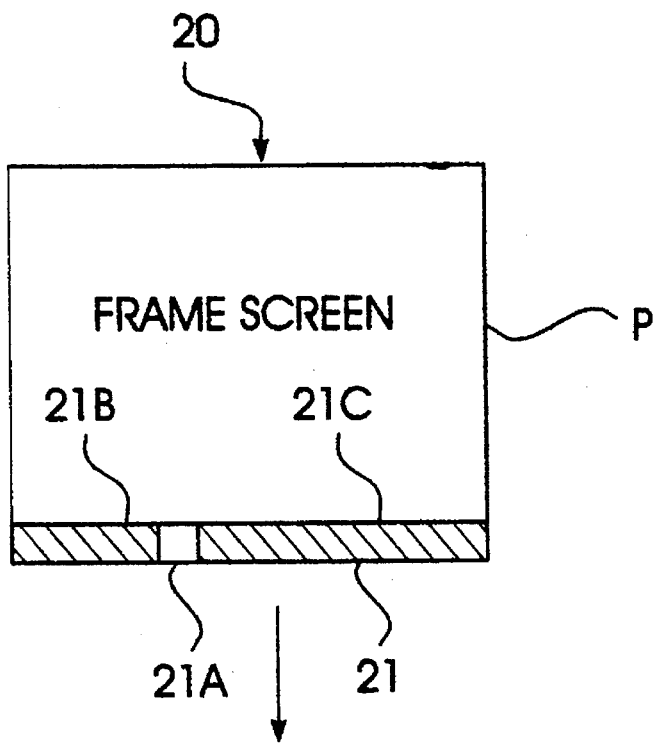
FIGS. 1A and 1B are schematic illustrations showing the display content of the embodiment of the present invention.
Figure 1B:
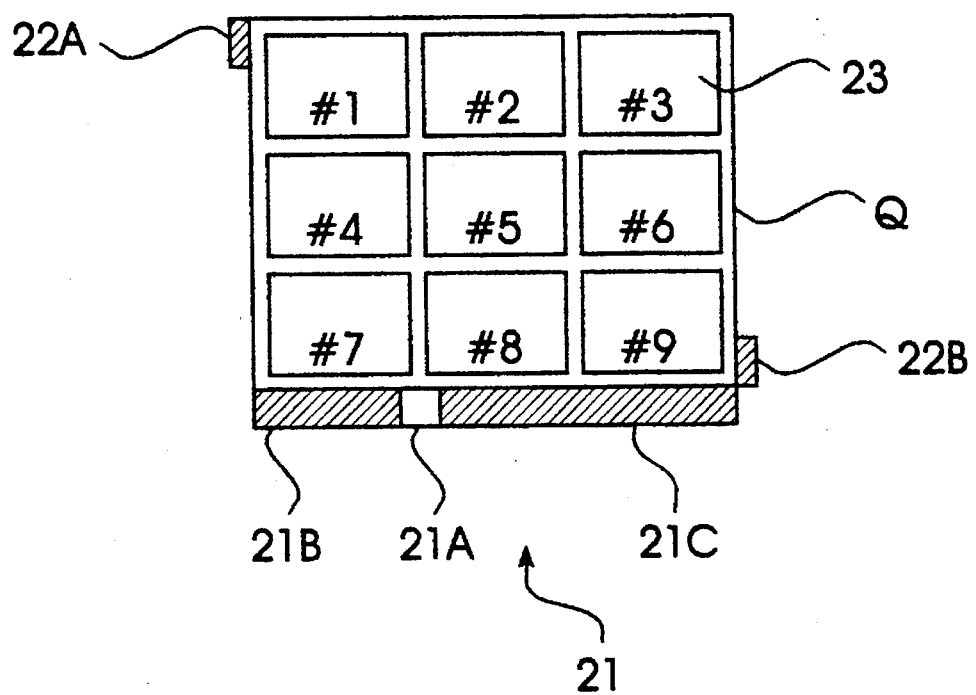

Frame search processing of the present invention will be described. A symbol (A) is FIG. 1 shows a display condition wherein a specific frame on the file storage device 30 is displayed in the display screen on the display 20. In FIG. 1, a display part P of the display 20 shows a frame screen. A display part 21 shows an entire scroll bar. A display part 21A shows a scroll box. The display part of the scroll bar (hereinafter referred to as the scroll bar) 21 is used for the user to set an initial frame search region.

Figure 3:
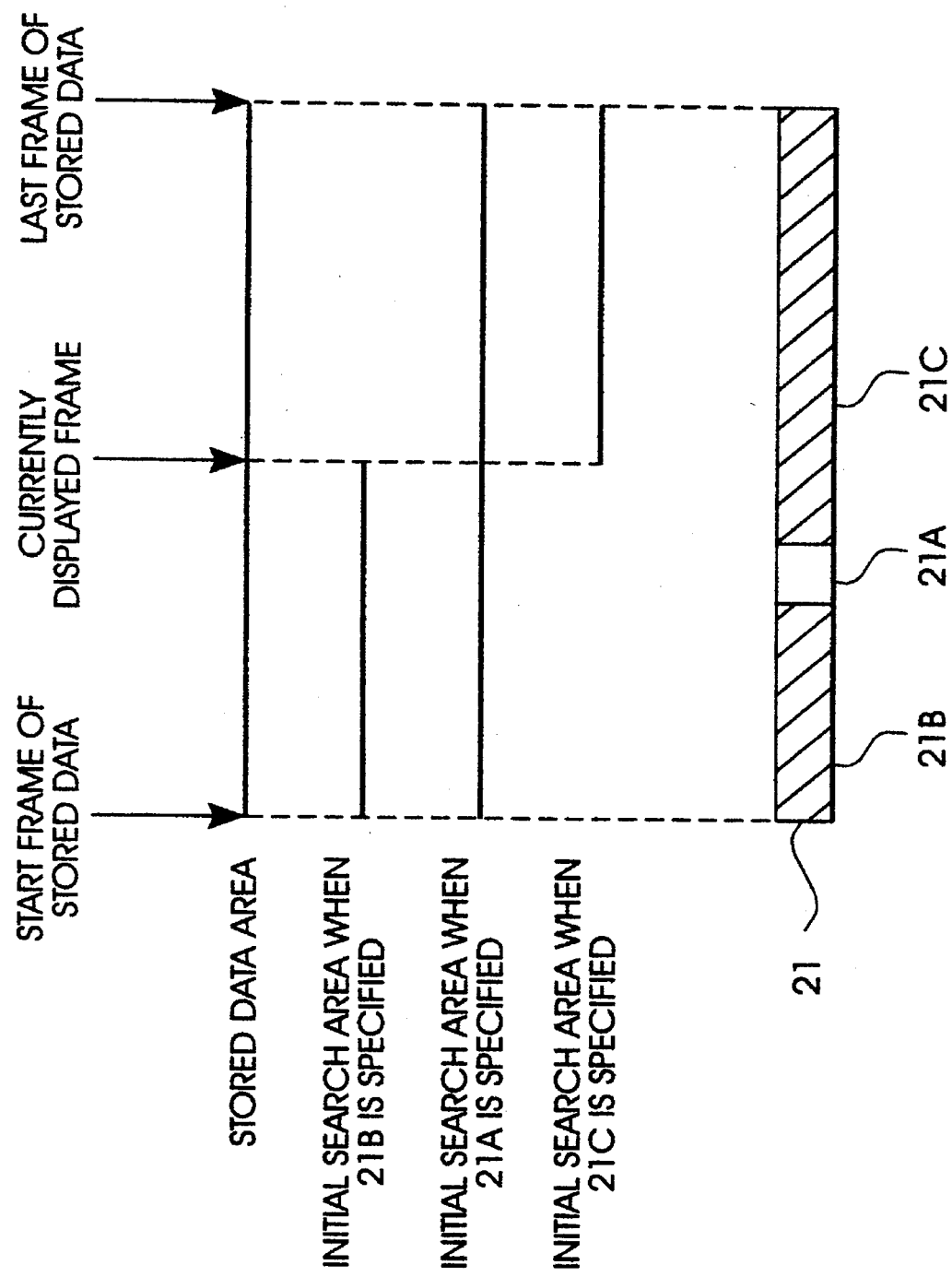
FIG. 3 is a schematic illustration showing the relation between the area to be searched and data position in the embodiment of the present invention.

As shown in FIG. 3, a position at which the scroll box 21A is displayed shows a relative storage position in the storage data of a currently displayed frame. When the user uses the mouse 40B to position a mouse cursor in the display screen in the scroll bar 21, and operates a specific key of the keyboard 40A, a wide range search mode of the present invention is set to enable frame search.

Figure 6:
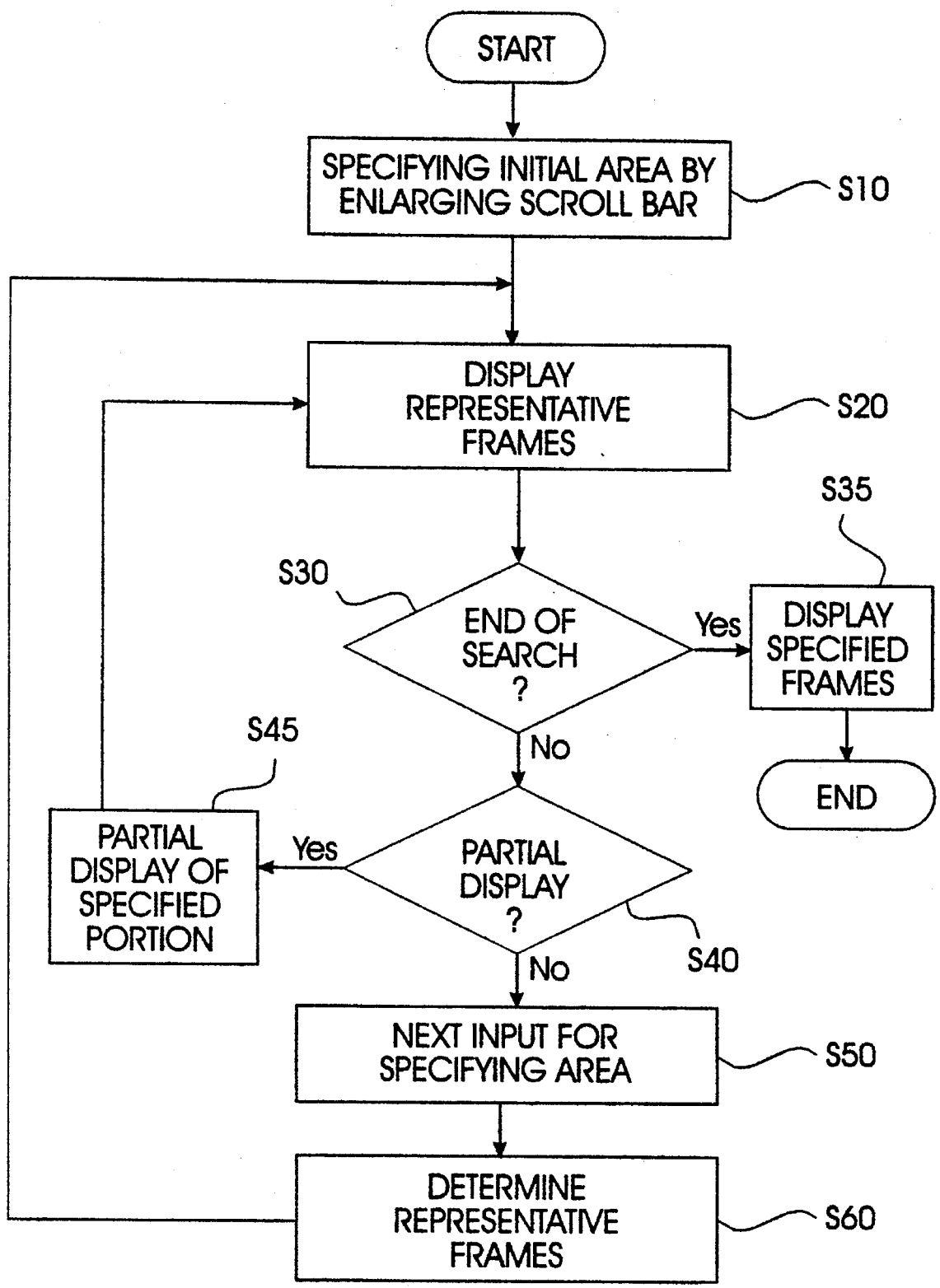
FIG. 6 is a flow chart showing the procedure executed by CPU 10A in FIG. 2.

According to this mode, the CPU 10A in FIG. 2 starts the control procedure of FIG. 6. The user specifies the wide range to be searched using the scroll bar 21 (step S10 in FIG. 6). To specify a search object from a stored start frame to a stored frame corresponding to the currently displayed frame, the user indicates a part 21B of (A) In FIG. 1 by the mouse 40B (FIG. 3). With this operation, the CPU 10A identifies the position of the mouse cursor in the execution procedure of steps of S100→S101→S102→S140 in FIG. 7, determines a start frame and a last frame of the region to be searched, and prepares a search region information (for example, frame storage address and frame number).

To specify a region from the stored frame corresponding to the currently displayed frame to the last storage frame as a searching target, the user indicates a part 21C of (A) in FIG. 1 by the mouse 40B. With this operation, the CPU 10A identifies the position of the mouse cursor in steps of S100→S110, and prepares search region information showing the specified region to be searched in steps of S111→S112.

To specify all of the stored data as a region to be searched, the user indicates the scroll box 21A of (A) in FIG. 1 by the mouse 40B. With this operation the CPU 10A identifies the position of the mouse cursor in the order of steps of S100→S110, and next, prepares search region information showing the specified region to be searched (steps of S120→S130). The CPU 10A which executes the above processing corresponds to the initial search region determination means of the embodiment of claim 2.

Figure 7:
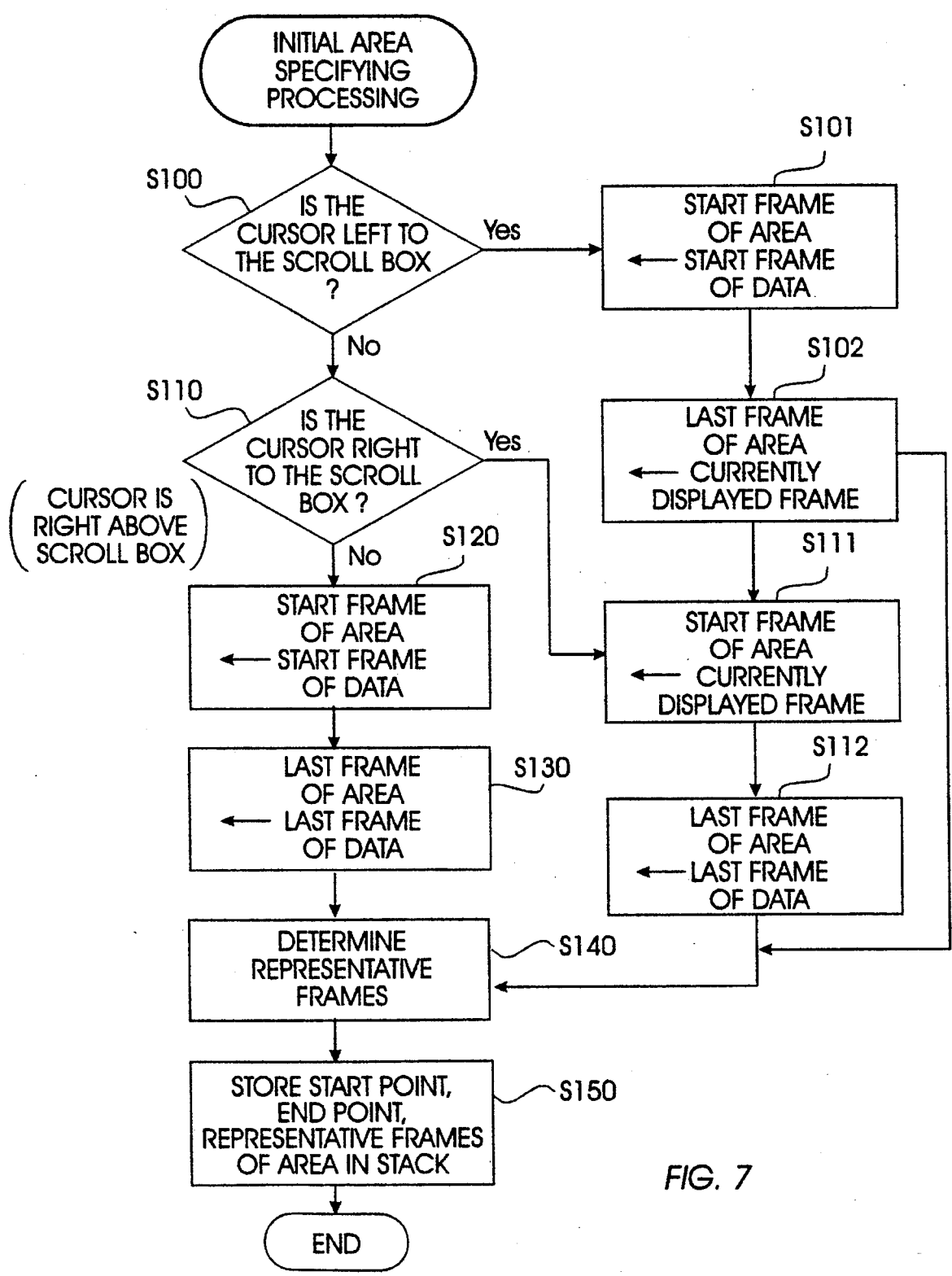
FIG. 7 is a flow chart showing the procedure executed by CPU 10A in FIG. 2.

In such a way the region to be searched is specified by the user, the CPU 10A determines storage frames to be read as representative frames in the specified region to be searched (step S140 in FIG. 7). The determination method of the representative frames will be described later. The prepared search region information, that is, the positions of the start point and the end point of the region to be searched and the positions of the determined representative frames are stored in a stack area in the work memory 10C (step S150 in FIG. 7). The execution procedure of the CPU 10A returns from FIG. 7 to FIG. 6, the representative frames are read from the file storage device 30 in step S20, and displayed on the display 20 as shown (B) in FIG. 1.

The CPU 10A in this case acts as data extracting means and display means (including the display 20) of the embodiment of claim 1.

The display screen (B) in FIG. 1 will be described.

A window display region Q displays a predetermined number (10, for example) of reduced frames 23, these are, the representative frames, a start icon 22A and an end icon 22B (corresponding to the start icon and the end icon of claim 6). All data to be searched are divided into 10 portions, frames located at the dividing positions (FIG. 5) are read for use as the reduced frames 23 from the file storage device 30 by the instruction of the CPU 10A and reduced. Since the individual reduced frames indicate the dividing positions in the area to be searched and currently set, the start icon 22A, the end icon 22B, and the representative frames are selectively used for specifying the area of subsequent search.

Figure 4A:
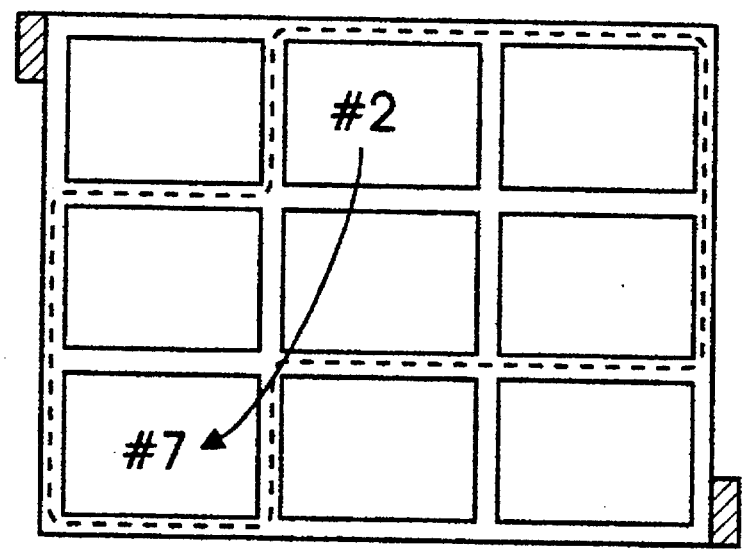
FIGS. 4A and 4B are schematic illustrations showing the procedure for specifying the area to be searched in the embodiment of the present invention.
Figure 4B:
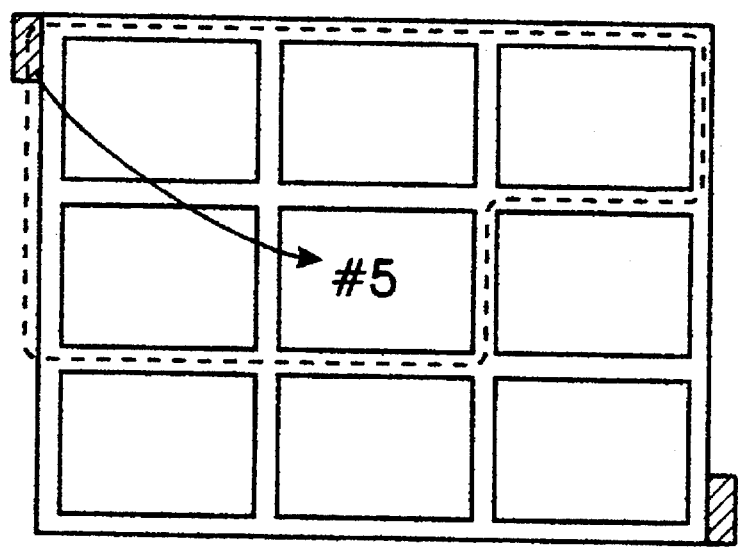

An operation example of specifying the area is shown in FIG.4.

A symbol (a) shows that the user indicates the representative frame #2 by the mouse 40B, then the representative frame #7, and specifies again an area between these frames as the area to be searched. Therefore, the mouse 40B acts as the selecting means in claim 1.

A symbol (b) shows that an area from a start frame of an area to be searched and currently set as a start point, to the representative frame #5 is reset as the area to be searched.

When the user re-specifies the area to be searched using the procedure as (a) in FIG. 4, the CPU 10A, as shown by the dotted lines of (a) and (b) in FIG. 4, displays an image surrounding the entire representative frames to inform the re-specified area to be searched. This processing corresponds to the processing step in claim 7. After that, the CPU 10A advances the execution procedure to S20→S30→S40→S50 and, accepts the instruction of the mouse 40B, to accept the re-specified area to be searched. Then, the CPU 10A divides the specified area to be searched, that is, the area lying between the stored screen images corresponding to the two representative screen images selected on the display screen into 10 portions to determine representative screens images of a new second stage (FIG. 5) (step S60). The CPU 10A in this case acts as the data search region determining and changing means in claim 1.

Figure 5:
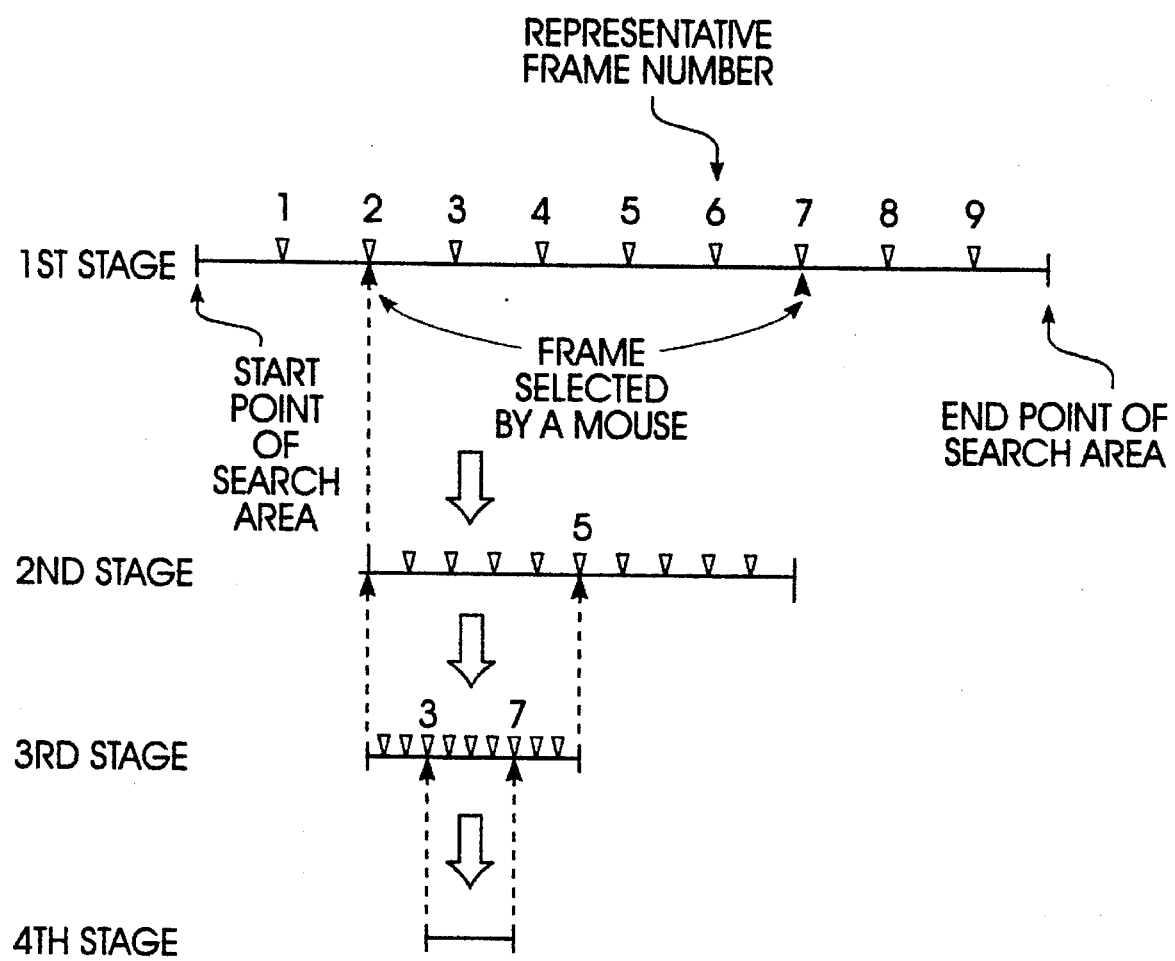
FIG. 5 is a schematic illustration showing the relation between the position of the representative screen and the area to be searched in the embodiment of the present invention.

The determined representative screen images are displayed on the display 20 (step S20). After that, the procedure of step S20–S60 is repeated so that reducing of the area to be searched and displaying of the representative screen images are performed. The example shown in FIG. 5 shows that the area to be searched is reduced to an area between the representative screen images #3 and #7 by the user.

When the user learns from the representative screen images that the area to be searched becomes closer to a desired frame, the user indicates a representative screen image closest to the desired frame in the representative screen images by the mouse 40B. When the CPU 10A detects the indication input (step S40 in FIG. 6), the CPU 10A reads a plurality of frames adjacent to the stored screen image corresponding to the indicated representative screen image from the file storage device 30 to display on the display 20 (step S45).

When the desired screen image is not obtained, the user searches using one of the following two methods. First, the representative screens displayed in the previous stage is displayed again by the instruction of the keyboard 40A or the mouse 40B. If necessary, the user re-indicates the area to be searched (step S40→S50→S60→S20). Secondly, after selecting a single representative screen different from the single representative screen selected by the above operation, reduced stored screens adjacent to the selected representative screen are displayed by the CPU 10A (steps of S40→S45). This procedure is repeated until the user finds the desired frame, and when the user inputs a search end instruction and an indication of the desired frame on the display screen by the keyboard 40A or the mouse 40B, the CPU 10A displays the stored screen image (original screen image) corresponding to the indicated (reduced) frame on the display 20, and ends the control procedure in FIG. 6 (steps of S30→S35→end).

As described above, using the representative screen images on the display screen, the user can reduce the area to be searched and search the desired frame. In the present embodiment, in addition to the above search function, the following two functions are provided for more efficient search by the user.

First, after the area to be searched is reduced by indicating two representative screen images, it is possible to revert back to the area to be searched before reduction. For this purpose, a region enlarging key for instructing return of the area to be searched is provided on the keyboard 40A. This function corresponds to the embodiment of claim 4.

Secondly, the representative screen images displayed in the progress of reducing the area to be searched should not be the same as those which were displayed in the previous stage. For this purpose, a stack area to cumulatively store the frame number used as the representative screen images is provided in the frame memory 10C in FIG. 2. This function corresponds to the embodiment of claim 5.

Figure 8:
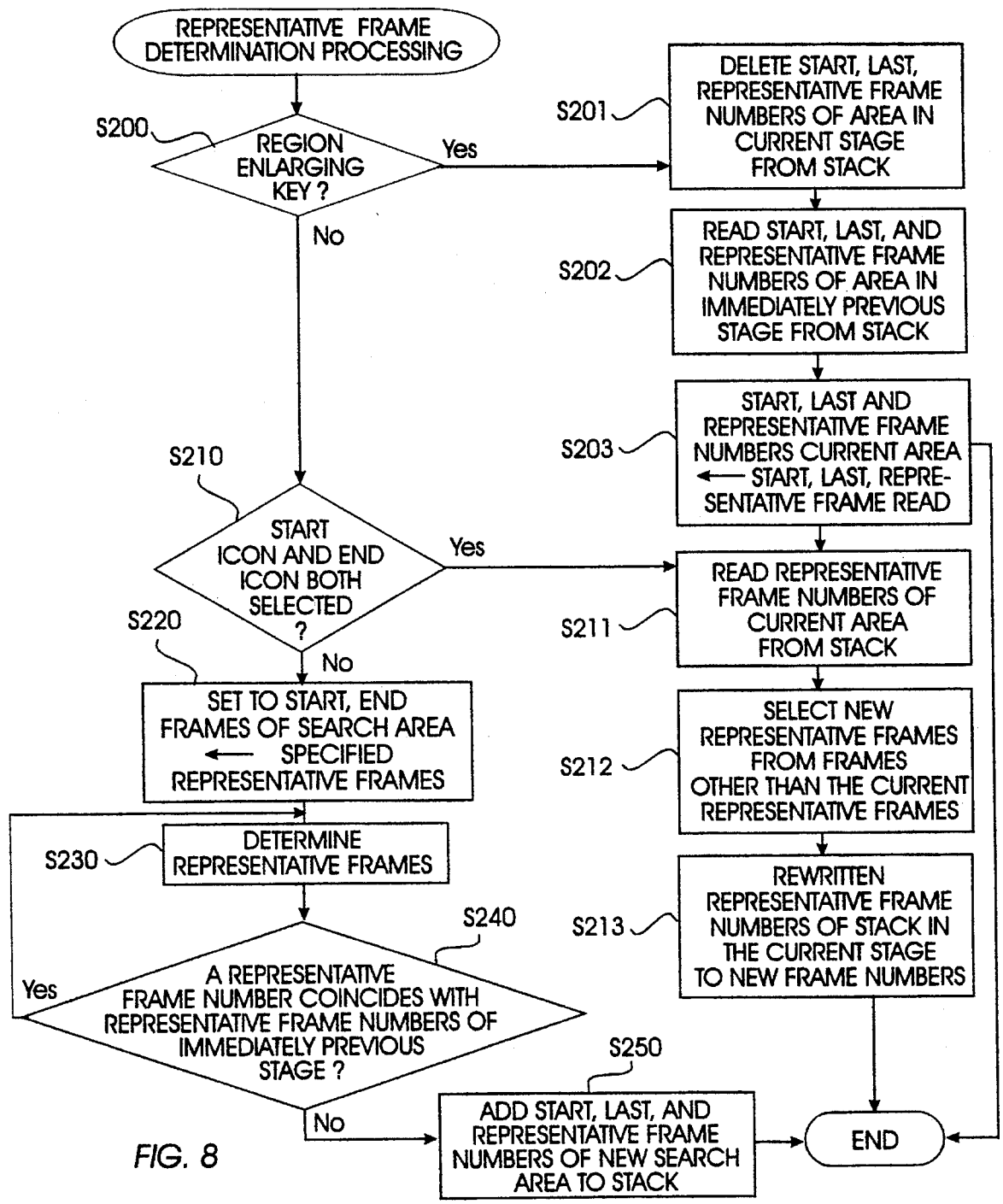
FIG. 8 is a flow chart showing the procedure executed by CPU 10A in FIG. 2.

An execution procedure of the CPU 10A to achieve the above two functions is shown in FIG. 8. The control procedure of FIG. 8 is executed in the representative frame determination processing of step S60 in FIG. 6. After the user selects the representative screen image and specifies the reduced area to be searched, when the region enlarging key is operated, the CPU 10A detects the operation in step S200 in FIG. 8 to delete the related information showing the current area to be searched and representative screens, that is, the start and last frame numbers of the area to be searched and the frame numbers of the representative screens, from the stack area (step S201).

Then, the CPU 10A reads the above related information of the prestage, that is, the start frame number, the last frame numbers, and the representative frame numbers, from the stack area, and sets them to the current related information (step S203). This related information is used to display the representative screen.

Figure 9:
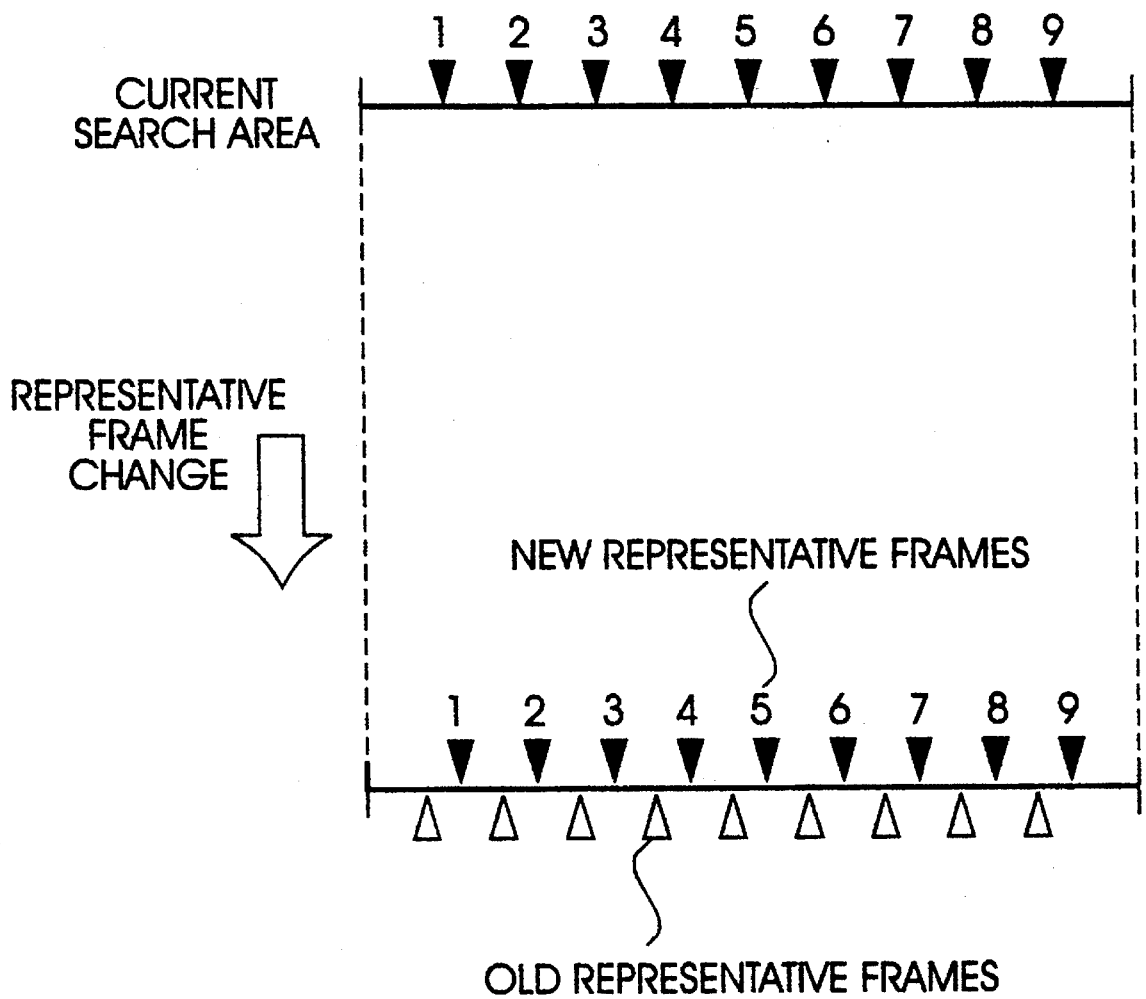
FIG. 9 is a schematic illustration showing a change in content of the representative screen.

After the reduced area to be searched is specified, when the user does not operate the region enlarging key, the CPU 10A identifies the content of the instruction for the reduced search. More specifically, when the start icon 22A and the end icon 22B are operated, the operation is detected in step S210 in FIG. 8, the CPU 10A reads the newest (current) representative frame numbers stored in the stack area, and updates current representative frame numbers into new numbers adjacent to the above newest representative frame numbers respectively as shown in FIG. 9. As a result, the representative screens can be changed respectively over to screens adjacent to the representative screens displayed up to now.

When the start icon 22A and the end icon 22B are not operated, the frame numbers used as the representative frames are determined within the specified area (steps of S200→S210→S220→S230). At this time, the newly set current representative frame numbers and the previous representative frame numbers are individually compared for coincidence. The representative frame number determined to coincide is changed, for example, to the adjacent frame number (steps of S240→S230). Thus, the currently set representative frame numbers are added to the stack area.

In addition to the present embodiment, the following example can be applied.

1) Prior to using the data search method of the present invention, for example, search by a file name or a keyword can be performed to limit the data group to be searched. When such a search method is used, it is preferable to select the search method on the menu screen.

2) As shown above, a very common case where only the frame number information is given to each frame of the image data has been described. However, an even more efficient search can be achieved when the inventive method can be used in combination with a representative frame determination method as disclosed in Japanese Patent Application No. 4-21443/1992. Specifically, when a representative frame based on a change in scene or the content of a story (hereinafter referred to as a semantic representative frame) is previously determined or can be determined automatically, an area to be searched is divided equally to determine temporary representative frames, and by adopting a semantic representative frame closest to the temporary representative frame as the representative frame of the area, it is possible to retrieve the content of the data in the region to be searched more positively thereby efficient search meeting the content of the data is possible.

3) In the present embodiment, an example where the data to be searched are movie data is shown, however, alternatively, other types of data groups such as a document text and a program text etc. can also be searching target.

For documents and programs, various methods can be considered for determining representative samples. The simplest method is to use number of lines of the text instead of number of frames of the image data. As methods which are more adapted to content of data, such methods are considered that for a start point of the representative sample, a line next to a space line, a character string which is known to appear at a punctuation of the text (for example, character string section in the document formatting software LATEX), a function defining section in a C program source, and the like are used respectively. In any of the above cases, the representative sample includes document data of a predetermined number of lines.

The search can be made more efficient by providing a mechanism for selecting one which is the most suitable for the present situation among the plurality of methods for taking representative sample through a graphical interface. Such an interface can be easily achieved.

While the embodiment has been described is a preferred embodiment of the invention so that those skilled in the art will recognize that the invention can be practiced with modification of the embodiment within the spirit and scope of the claims.

As described above, since in the embodiments, displayed representative data are used to reduce the area to be searched, the user can easily operate to specify the area to be searched, and the search time is reduced. Furthermore, since the area to be searched can be not only reduced but enlarged, a trial-and-error search is also possible with simple operation. In addition, representative data displayed in a plurality of stages are not overlapped, and the user can know numbers of data.

We claim:

1. A data search apparatus for locating a data item within a sequence of data the apparatus comprising:

dividing means for dividing the sequence of data at a plurality of dividing positions within the sequence of data;

extracting means for extracting a plurality of representative samples of data from said sequence of data, each one of the representative samples being located at a respective one of the plurality of dividing positions;

display means for displaying said plurality of representative samples of data extracted by the means for extracting;

selecting means for selecting two of the representative samples displayed by the display means, the two selected samples surrounding the data item to be located; and determining means for determining a new subsequence of data to be searched, the new subsequence of data having start and end positions which are specified by said two selected representative samples;

whereby finding the data item is facilitated because the new subsequence of data is smaller than the sequence of data.

2. The data search apparatus as claimed in claim 1 further comprising initial data search region determining means for determining an initial region of data to be searched according to a position on a scroll bar specified by a user.

3. A data search method for locating a data item within a sequence of data, the method comprising the steps of:

dividing the sequence of data at a plurality of dividing positions located within the sequence of data;

extracting a plurality of respective samples of data from said sequence of data, each one of the representative samples being located at a respective one of the plurality of dividing positions;

displaying said plurality of representative samples of data extracted in the step of extracting;

selecting two of the representative samples displayed in the step of displaying, the two selected samples surrounding the data item to be located; and determining a new subsequence of data to be searched, the new subsequence of data having start and end positions which are specified by said two selected representative samples;

whereby finding the data item is facilitated because the new sequence of data is smaller than the sequence of data.

4. The data search method as claimed in claim 3 further comprising the step of convertibly displaying a plurality of second representative samples which are obtained from the sequence of data to be searched, the step of convertibly displaying being executed before execution of the step of determining, instead of a plurality of first representative samples according to an external instruction when said plurality of first representative samples obtained from said new subsequence of data to be searched are displayed.

5. (Amended) The data search method as claimed in claim 4 further comprising the steps of;

determining whether or not there are representative samples coinciding with each other between a plurality of second representative samples obtained from said sequence of data to be searched, the step of convertibly displaying being executed before execution of the step of determining, and a plurality of first representative samples when said plurality of first representative samples obtained from said new sequence of data to be searched are displayed; and changing the coinciding first representative samples to display the changed samples when an affirmative determination is obtained by the step of determining.

6. The data search method as claimed in claim 3 further comprising the step of:

displaying a start icon and an end icon individually indicating said start and end positions of said sequence of data to be searched in said representative sample displaying step, the start and end positions of said new sequence of data to be searched being determined according to an instruction of said start icon or said end icon in said step of determining.

7. The data search method as claimed in claim 3 further comprising the step of displaying a region specified by said selected two representative samples in connection with a display of said plurality of representative samples.

8. The data search method as claimed in claim 3 wherein said sequence of data are movie data, and said representative sample is image data of one frame.

9. The data search method as claimed in claim 3 wherein said sequence of data are text data, and said representative sample is data in a predetermined amount within said text data.

10. The data search apparatus as recited in claim 1 further comprising means for repeating operation of the means for dividing, extracting, displaying, selecting, and determining over the new subsequence.

11. The data search method as recited in claim 3 further comprising the step of repeating the steps of dividing, extracting, displaying, selecting, and determining over the new subsequence.

* * * * *